UNITED STATES PATENT OFFICE.

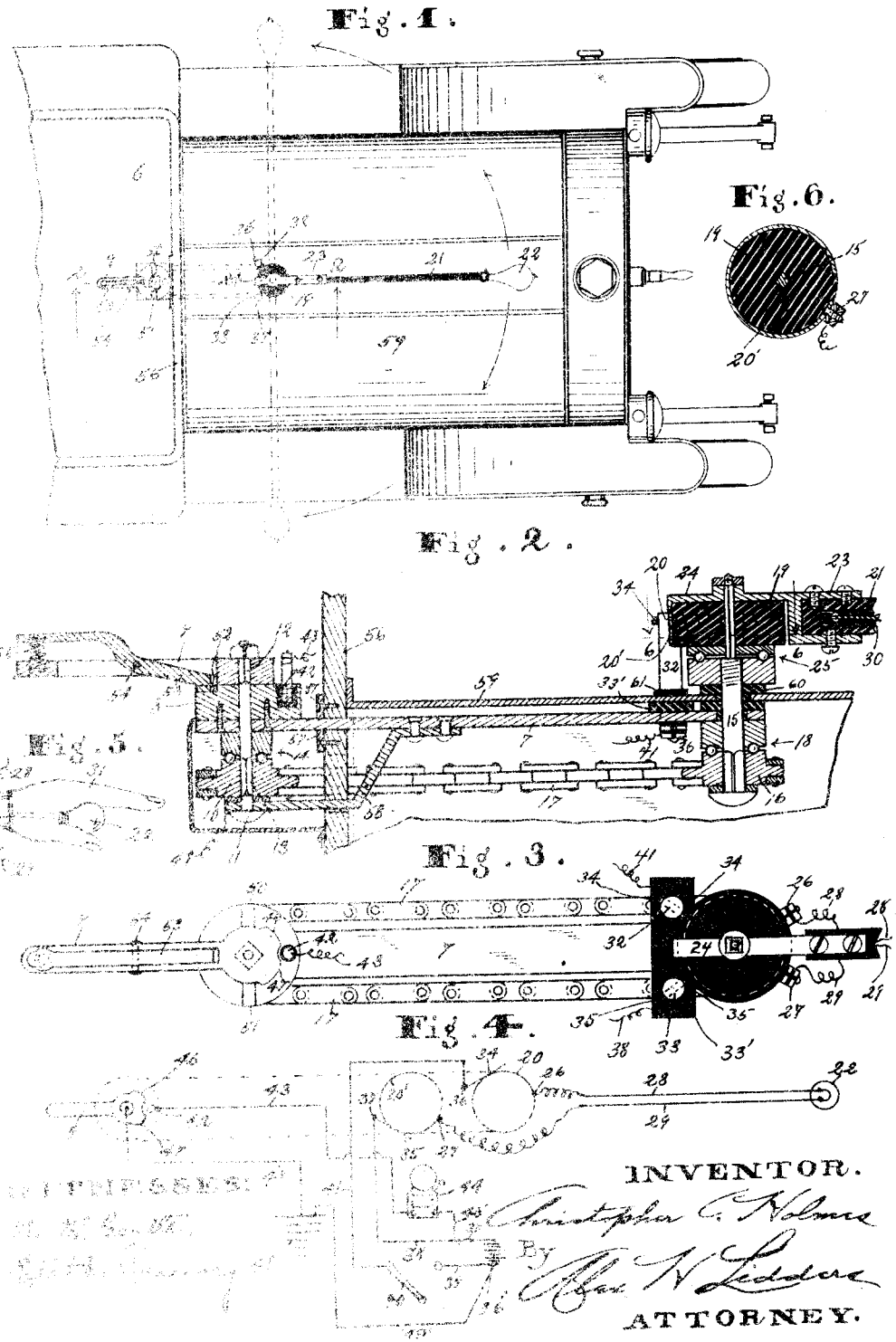

CHRISTOPHER C. HOLMES, OF PASADENA, CALIFORNIA.

SIGNAL APPARATUS FOR AUTOVEHICLES.

1,128,250.

Specification of Letters Patent.

Patented Feb. 9, 1915.

Application filed March 24, 1914. Serial No. 827,004.

*To all whom it may concern:*

Be it known that I, CHRISTOPHER C. HOLMES, a citizen of the United States of America, residing at Pasadena, county of Los Angeles, State of California, have invented a certain new and useful Signal Apparatus for Autovehicles; and I do hereby declare the following to be a full, clear, and exact description of the invention, such as will enable others skilled in the art to which it appertains to make and use the same.

This invention relates to signal apparatus for auto vehicles, and it may be said to consist in the provision of the novel and advantageous features and in the novel and improved construction, arrangement and combination of parts and devices as will be apparent from the description and claims which follow hereinafter.

One object of the invention is to provide novel and improved apparatus of the class specified which is adapted to indicate beforehand at a distance fore and aft of the vehicle, whether the operator of the vehicle intends to turn it to the right or to the left.

Further objects of the invention are to provide novel and approved apparatus of the class specified which is adapted for both day and night service, is simple in construction, economical to manufacture, install, and maintain, readily applied to existing auto vehicles, easy to operate, convenient to use, attractive in appearance, effective in action, and which is adapted to give an audible signal while the visual signal is being operated.

Other objects and the advantages of the invention will be apparent from a careful consideration of the following description of one form of the apparatus embodying the invention, taken in connection with the accompanying drawings in which—

Figure 1 is a broken plan view of an auto vehicle having the improved signal apparatus applied thereto; Fig. 2 is an enlarged broken sectional view taken on the line 2—2 of Fig. 1; Fig. 3 is an enlarged broken plan view of the improved signal apparatus; Fig. 4 is a diagrammatic view of parts and the electric circuits; Fig. 5 is an elevational view of one form of the visual signal, and Fig. 6 is a cross sectional view taken on the line 6—6 of Fig. 2.

The improved signal apparatus may be arranged at either the front or the rear of the auto vehicle 6, but it is preferably arranged at the front of the auto vehicle as is shown in this case. A strip 7, preferably metal, has suitably secured on one end thereof a bearing block 8 on which rests one end of a handle 9. Below the strip 7 is arranged a sprocket wheel 10 through which and the strip 7, bearing block 8, and handle 9 passes a bolt 11 which latter is preferably formed with squared portions 12 and 13 so that the sprocket wheel 10 turns when the handle 9 is turned. A suitable ball bearing 14 may be provided for the sprocket wheel 10. Through the other end of the strip 7 passes a bolt 15 which has on the lower squared end thereof a sprocket wheel 16 around which and around the sprocket wheel 10 passes a chain 17. A ball bearing 18 may be provided for the sprocket wheel 16. On the squared upper end portion of the bolt 15 is fitted a circular block 19 of insulating material having thereon strips 20 and 20′ of conducting material. An arm 21, preferably of fiber or other suitable insulating material, has mounted on one end thereof a suitable electric lamp 22 and has the other end thereof preferably suitably secured in a socket 23 which is provided with an extension 24 fitted above the block 19 on the upper end portion of the bolt 15. A suitable ball bearing 25 may be provided for the block 19. To the strips 20 and 20′ are connected suitable binding nuts or screws 26 and 27 for the conductors 28 and 29 which lead to the lamp 22 through a passageway 30 in the arm 21. The visual signal on the free end of the arm 21 is preferably in the form of a hand 31 having mounted thereon the lamp 22. The hand 31 is preferably white to be conspicuous on the arm 21 which may be black. Posts 32 and 33 are mounted on an insulating block 33′ suitably secured to the strip 7, and they have thereon brushes 34 and 35 which are respectively arranged to make wiping contact with the strips 20 and 20′. Binding nuts 36 and 37 are provided on the posts 32 and 33. One terminal of the battery 36′ or other suitable source—not shown—of electric current is connected to the binding nut 37 through conductor 38, and the other terminal of the source of electric current is connected to the binding nut 36 through conductor 39, switch 40, and conductor 41. The block 8 has thereon an insulated binding post 42 to which is connected one end of a conductor 43 which latter has its other end connected to one terminal of an audible signal such as a bell or buzzer 44. The other terminal of the audible signal may be connected to the source 36' of electric current through the conductors 45 and 38. Projections 46 and 47 are provided on the handle 9 and adapted to make wiping contact with the post 42 to close the circuit through the audible signal 44 while the handle is being turned to operate the arm 21 to display the visible signal 31. The handle 9 may be connected to the ground 48 through a conductor 49, and the source 36' of electric current may be connected to the ground 48 through a conductor 49'. Notches 50 and 51 at right angles to a notch 52 are provided in the bearing block 8, and a dog 53 is mounted on a pivot 54 on the handle 9 and has one end thereof adapted to fit in the notches 50, 51, and 52, and has the other end thereof pressed by a spring 55 which is interposed between said dog and the handle 9.

When the signal apparatus is arranged at the front end of the auto vehicle 6—as shown in this instance—the end portion of the strip 7 having the block 8 thereon may be passed through the dashboard 56 and a strengthening plate 57 suitably secured on the dashboard, and a brace 58 may have one end portion suitably secured to the strip 7 and its other end portion fitted on the bolt 11. The other end portion of the strip 7 may be disposed under the top part of the hood 59, and the bolt 15 and the posts 32 and 33 may be passed through insulating bushings 60 and 61 fitted in openings through the top part of the hood.

From the foregoing description the mode of operation of the signal apparatus will be readily understood by those skilled in the art. In the normal or neutral position the arm 21 extends longitudinally of the hood 59, and the dog 53 fits in the notch 52 to hold the arm 21 from movement. When the operator intends to turn the auto vehicle 6 to the right, he presses down on the dog 53 and turns the handle 9 to the left until the dog 53 fits in the notch 50; and when he intends to turn the auto vehicle to the left from normal position, he presses down on the dog 53 and turns the handle 9 to the right until the dog 53 fits in the notch 51. When the handle 9 is turned to the left the arm 21 is swung to the right, and when the handle 9 is turned to the right the arm 21 is swung to the left. When the handle 9 has been turned to have the dog 53 fitted in either of the notches 50 and 51, the arm 21 is locked in position and extends substantially at right angles to the auto vehicle, and the visual signal 31 extends outwardly beyond the side of the auto vehicle so that it can be easily seen at a distance fore or aft of the auto vehicle. While the handle 9 is being turned to the right or the left, the projection 47 or the projection 46 thereon makes wiping contact with the post 42 to close the circuit through the audible signal 44, whereupon current from the source 36' passes through conductors 38 and 45, thence through the audible signal 44, thence through conductor 43, post 42, handle 9, thence through the bolt 11 and conductor 49 to the frame or ground 48, and thence through the conductor 49' to the source 36'. At night, the switch 40 being closed, current passes from the source 36', thence through conductor 38, brush 35, conducting strip 20', conductor 29, lamp 22, conductor 28, conducting strip 20, brush 34, conductor 41, switch 40, and conductor 39 to the source 36'.

While one form of signal apparatus embodying the invention has been particularly illustrated and described, there are many minor changes and modifications thereof that will readily occur to those skilled in the art—wherefore the right is reserved to all such changes and modifications as do not depart from the spirit and scope of the invention as defined in the appended claims.

I claim:

1. In apparatus of the class specified, the combination of a strip, a bearing block mounted on one end portion of the strip, a post on the bearing block, a bolt passing through said strip and through said bearing block, a handle affixed on said bolt and rotatively mounted on the bearing block, said handle provided with projections adapted to make wiping contact with the post when said handle is turned, a source of electric current, an audible signal, electrical connections between said source of electric current and the audible signal, post, and handle, a bolt passing through the other end portion of the strip, an arm operatively connected with the last mentioned bolt, sprocket wheels on the bolts, a chain passing around the sprocket wheels, a visual signal at the free end of said arm, and means for locking said handle in adjusted position on the bearing block.

2. In apparatus of the class specified, the combination of a strip, a bearing block mounted on one end portion of the strip, a bolt passing through said strip and through said bearing block, a handle affixed on said bolt and rotatively mounted on the bearing block, a bolt passing through the other end portion of the strip, a circular block of insulating material mounted on the last mentioned bolt, conducting strips mounted on the circular block, an insulating block mounted on the strip, posts mounted on the insulating block, brushes mounted on the posts and adapted to make wiping contact with said conducting strips, an arm operatively connected with the last mentioned bolt, sprocket wheels on the bolts, a chain passing around the sprocket wheels, a source of electric current, a lamp arranged on the free end of said arm, electrical connections between said conducting strips and said lamp, electrical connections between the source of current and said posts, and means for locking said handle in adjusted position on said bearing block.

3. In signal apparatus for auto vehicles having a hood and dashboard, the combination of a strip passing through the dashboard and extending under the upper part of the hood, a bearing block mounted on one end portion of the strip, a bolt passing through said strip and through said bearing block, a handle affixed on said bolt and rotatively mounted on the bearing block, a bolt passing through the other end portion of the strip and through said hood, an arm operatively connected with the last mentioned bolt, sprocket wheels on the bolts, a chain passing around the sprocket wheels, a visual signal arranged on the free end of said arm and adapted to extend beyond the side of the auto vehicle when said handle is turned, and means for locking said handle in adjusted position on the bearing block.

4. In signal apparatus for auto vehicles having a hood and a dashboard, the combination of a strip passing through the dashboard and extending under the upper part of the hood, a bearing block mounted on one end portion of the strip, a post on the bearing block, a bolt passing through said strip and through said bearing block, a handle affixed on said bolt and rotatively mounted on the bearing block, said handle provided with projections adapted to make wiping contact with said post when the handle is turned, a source of electric current, an audible signal, electrical connections between the source of electric current and the audible signal, post, and handle, a bolt passing through the other end portion of the strip and through said hood, a circular block of insulating material mounted on the last mentioned bolt, conducting strips mounted on the circular block, an insulating block mounted on the strip, posts mounted on the insulating block and passing through said hood, brushes mounted on the posts and adapted to make wiping contact with the conducting strips, an arm operatively connected with the last mentioned bolt, sprocket wheels on the bolts, a chain passing around the sprocket wheels, a lamp arranged at the free end of said arm, electrical connections between said conducting strips and said lamp, electrical connections between the source of current and said posts, and means for locking said handle in adjusted position on the bearing block.

In testimony whereof, I have signed my name to this specification in the presence of two subscribing witnesses at Los Angeles, county of Los Angeles, State of California, this 18th day of March A. D. 1914.

CHRISTOPHER C. HOLMES.

Witnesses:
CHARLES PRINCE,
MARY PRINCE.